United States Patent
Susnjara

(10) Patent No.: US 12,053,924 B1
(45) Date of Patent: Aug. 6, 2024

(54) CONSTRUCTING PARTS USING CUT LAYER ADDITIVE MANUFACTURING

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 18/315,907

(22) Filed: May 11, 2023

(51) Int. Cl.
*B29C 64/147* (2017.01)
*B29C 64/314* (2017.01)
*B33Y 10/00* (2015.01)
*B33Y 40/10* (2020.01)

(52) U.S. Cl.
CPC .......... *B29C 64/147* (2017.08); *B29C 64/314* (2017.08); *B29C 2793/0018* (2013.01); *B29C 2793/0081* (2013.01); *B33Y 10/00* (2014.12); *B33Y 40/10* (2020.01)

(58) Field of Classification Search
CPC .... B29C 2033/385; B29C 33/301–302; B29C 33/3842; B29C 64/147; B29C 64/314; B32B 37/12–1292; B23P 15/246; G05B 19/4099; G05B 2219/49007; B33Y 10/00; B33Y 40/10
See application file for complete search history.

(56) References Cited

U.S. PATENT DOCUMENTS

| | | | | |
|---|---|---|---|---|
| 5,031,483 A | * | 7/1991 | Weaver | B29C 33/302 451/5 |
| 8,062,023 B2 | * | 11/2011 | Appleby | G03F 7/0017 425/470 |
| 9,550,349 B1 | * | 1/2017 | Larsen | F28F 3/02 |
| 11,345,081 B1 | | 5/2022 | Susnjara | |
| 2003/0145942 A1 | * | 8/2003 | Andrews | B29C 66/133 428/34.1 |
| 2004/0091734 A1 | * | 5/2004 | Manuel | B23P 15/246 427/256 |
| 2009/0142549 A1 | * | 6/2009 | Manuel | B29C 33/38 428/137 |
| 2017/0274563 A1 | * | 9/2017 | De Waal Malefijt | B29C 33/301 |

* cited by examiner

*Primary Examiner* — Philip C Tucker
*Assistant Examiner* — Andrew L Swanson
(74) *Attorney, Agent, or Firm* — Bookoff McAndrews, PLLC

(57) ABSTRACT

A method of manufacturing a part using a cutting machine includes placing a non-porous sheet on a surface of a material cutting machine, removing material from the non-porous sheet to form a plurality of sections of the part, and while the non-porous sheet is present on the material cutting machine, forming fastening holes within the sections. The method further includes removing the sections from a remainder of the sheet, placing the sections together such that each section of the part abuts another section, and inserting fasteners through the fastening holes of the sections.

13 Claims, 18 Drawing Sheets

CONSTRUCTING PARTS USING CUT LAYER ADDITIVE MANUFACTURING

TECHNICAL FIELD

Aspects of the present disclosure relate to apparatus and methods for fabricating components. Some aspects of the present disclosure relate to methods and systems for fabricating components (e.g., patterns, molds, similar products, or other parts) via techniques or processes that are analogous to 3D printing manufacturing processes involving layering. These techniques or processes may enable, in at least some embodiments, production of lower-cost molds or tooling without the use of a 3D printer.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc.

Some additive manufacturing techniques use large-scale 3D printers that are capable of fabricating very large parts, molds, patterns, etc. These parts can be produced from fiber-reinforced thermoplastic materials, for example. One method of producing these parts utilizes a polymer extruder which generates a bead of molten thermoplastic material which is added to the part being produced one layer at a time. These layers can be modified and/or flattened into wider beads during the additive manufacturing process using devices such as tamping plates, rollers, or the like. Using these approaches, sometimes referred to as 3D printing, the part is made slightly larger than desired. After the part cools and hardens, it is then machined to the final size and shape. The resulting part is generally a shell of a specific thickness and of the approximate size and shape desired.

A different type of additive manufacturing can be referred to as "cut layer" additive manufacturing. In some examples of cut layer additive manufacturing, pieces can be cut from porous material, stacked on top of one another, and attached together to create a part. In some cases, this part may be hollow, comprised of individual parts that are narrow beads that, when stacked together, create a shell or wall around the outside shape of the desired part. In some approaches, a shell or wall is built from a porous material and infused with a catalyzed thermoset liquid. The liquid cures to produce a rigid composite part reinforced with the porous material.

There are times, however, when it is desirable to produce a part from non-porous material such as metal (e.g., aluminum). Examples of potential applications for such a part include industrial molds and tooling such as thermoforming molds, compression molds, and injection molds. In general, aluminum molds for applications such as compression or injection molds are not suitable for long-term production but can be desirable for prototyping and short run sample production, provided that the aluminum molds have a suitable cost and can be produced in an appropriate period of time.

One reason aluminum is not always used for these applications is that molds, which can be relatively large, involve use of large blocks of material and significant time to remove (e.g., machine away) excess material to produce the desired cavity shape of the mold. This is especially true of large, deep parts where more than half the initial material may need to be removed to achieve the final part geometry desired. Also, this type of tooling can involve internal channels, through which heated or cooled liquid can be circulated to control the temperature of the tool during operation. Machining these channels in a solid block of material requires significant time and specialized equipment, further increasing build time and cost. Also, in many cases, it may not be possible to locate these channels in certain areas of the mold, that would otherwise be desirable, by machining into a solid block from the outside.

SUMMARY

Aspects of the present disclosure relate to, among other things, methods and apparatus for fabricating components via layering techniques. Each of the aspects disclosed herein may include one or more of the features described in connection with any of the other disclosed aspects. Some aspects of this disclosure utilize an additive manufacturing approach related to that described in U.S. patent application Ser. No. 17/322,477.

Some aspects of the disclosure involve producing non-porous molds, including molds made from material such as metal (e.g., aluminum), or other product(s) that may benefit from additive manufacturing via cut layers. Parts may be produced with a CNC router or other material cutting machine, which can have a relatively lower cost than a traditional additive manufacturing machine with an extruder. These layered parts, used to construct a mold for example, may be nested on sheet material to achieve a high yield. The sheets of material may also have a lower cost, on per/pound basis, than a large block of the same material suitable to create the mold. The individual layered parts may be machined to accept dowels or other alignment device to facilitate the process of aligning the individual layers. Also, each layer may be machined to create channels when assembled, for coolant, air, glue, etc., and/or machined to contain information about each layer. This information may include where the layer is intended to be located in the assembly. To farther achieve the best possible yield, the individual layers can be made up from two or more pieces with proper joint connections. Then, the individual layer parts can be secured together by means of adhesive, bonding agents, mechanical fasteners, or a combination thereof.

For molds that may be subjected to higher levels of stress during their operation, a different method of securing the layers together can be used. Different types of materials with differing coefficients of expansion, differing from the actual layer material, can be used to secure the layers together. Thus, as when heated up or cooled down, a compression force can be created in the assembly itself.

In one aspect, a method of manufacturing a part using a cutting machine may include placing a non-porous sheet on a surface of a material cutting machine, removing material from the non-porous sheet to form a plurality of sections of a part, and while the non-porous sheet is present on the material cutting machine, forming fastening holes within the sections. The method may further include removing the sections from a remainder of the sheet, placing the sections together such that each section of the part abuts another section, and inserting fasteners through the fastening holes of the sections.

In another aspect, a part formed at least in part from a sheet of material may include a series of layers that includes at least a first layer and a second layer formed from the sheet of non-porous material, a first through-hole in the first layer, and a second through-hole in the second layer, the second through-hole aligned with the first through-hole. The part may also include a fastener extending through the first through-hole and through the second through-hole and at least a portion of a coolant channel extending through the first layer and the second layer.

In yet another aspect, a method of manufacturing a part using a cutting machine may include placing a sheet of material on a surface of a material cutting machine, removing material from the sheet to form a plurality of sections of a part, and removing additional material from the non-porous sheet to form a slot for vacuum-forming, a path for coolant, or both. The method may further include separating the sections from a remainder of the sheet and assembling the sections together to form the part, including securing the sections with adhesive, fasteners, or both, such that an internal channel is formed through at least two of the sections.

Other advantages include, for example, that the part (e.g., mold) may require significantly less machining to achieve its final size and shape. Therefore, the process may involve less time and less tooling cost for creating the final product. Also, heating and/or cooling channels can be machined into cut sheets for parts in which it may be difficult or impossible to machine channels into a solid block of material.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating multiple components via layering techniques. Specifically, the methods and apparatus described herein may facilitate the creation of patterns, molds and other products. In some aspects, exemplary approaches for creation of parts are described in U.S. patent application Ser. No. 17/322,477, filed on May 17, 2021, which issued as U.S. Pat. No. 11,345,081, on May 31, 2022, the entirety of which is incorporated herein by reference.

Figure 1:
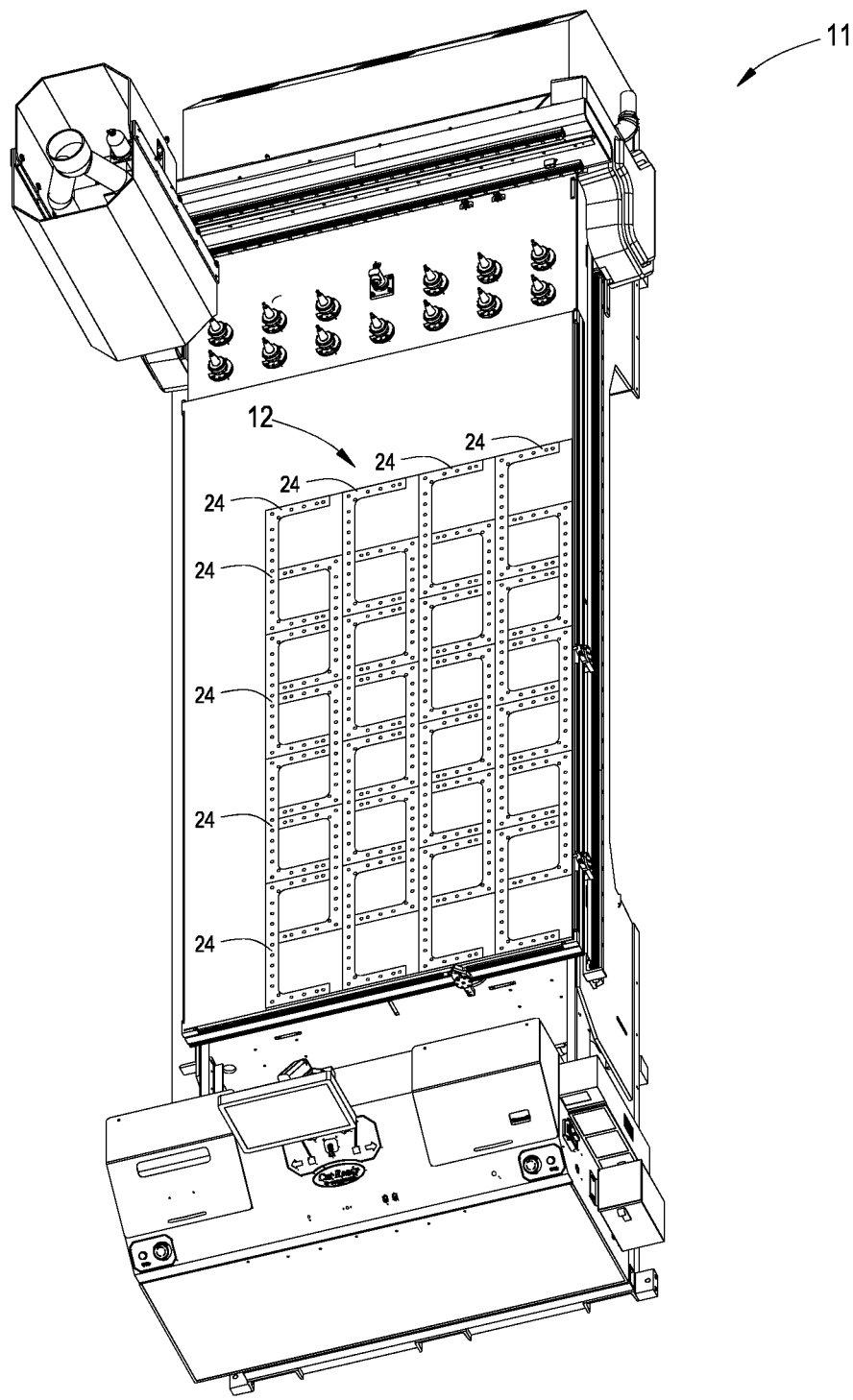
FIG. 1 is a perspective view of an exemplary material cutting machine operable to rout layers of relatively low-cost layer materials, according to aspects of the present disclosure.

One or more aspects of the present disclosure may involve one or more non-porous materials, such as metals (e.g., aluminum), and may require reduced time and relatively lower cost. In some aspects, a mold blank may be assembled by stacking sections, cut from sheets of material (e.g., aluminum), to produce a layered mold blank that is approximately the size and shape of the final mold desired. This may avoid the need to machine a mold from a solid block of material. A layered mold blank, formed by stacked parts, may be machined to a desired final size and shape after being assembled. This process may produce a part that is similar in structure to parts fabricated by other additive manufacturing methods, in that the part may be built in layers. As shown in FIG. 1, the layers in at least some of the approaches disclosed herein are cut from sheets of material on a material cutting machine, such as a CNC router 11, a milling machine, etc., and assembled, rather than the layers being applied to each other during a 3D printing process.

Figure 2:
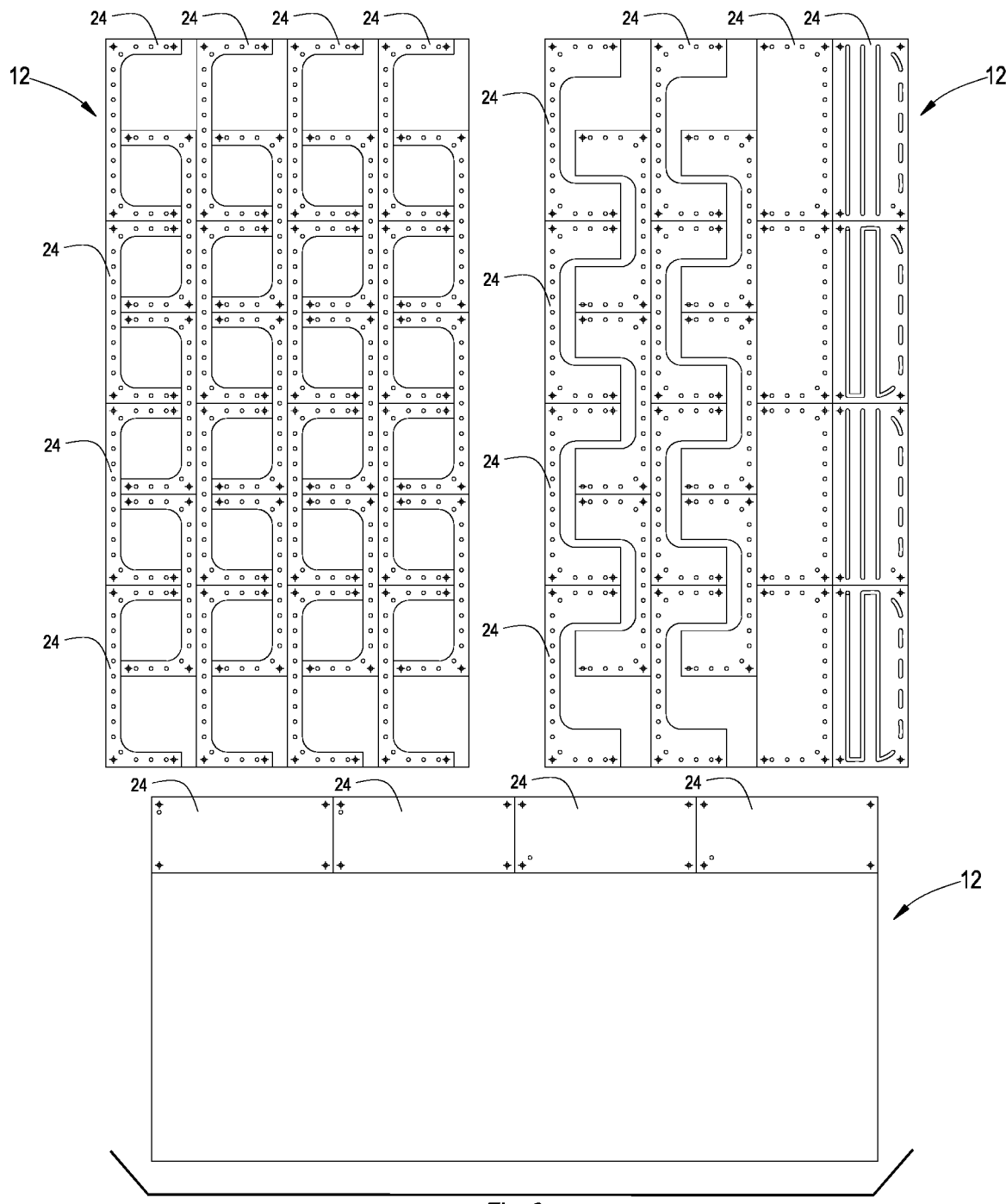
FIG. 2 is a top view of exemplary mold layer sections nested in larger sheets of material for reducing material requirements.

Individual layer sections 24, used to construct the mold, may be nested with each other on a sheet of material 12 as shown in FIGS. 1 and 2. Nesting sections 24 in an individual sheet of material 12 may provide an improved yield, especially when individual sections 24 are formed with a cutting machine, such as a CNC router 11 (FIG. 1). As shown in FIGS. 1 and 2, different individual sections 24 may have different shapes, while at least some sections 24 may have the same shape. Each section 24 may form an entire layer of part 20 (which is described below), or a portion of a particular layer of part 20. While an entire part may be formed from a single sheet of material 12 (e.g., one of the three sheets 12 shown in FIG. 2), a plurality of sheets 12 of material may be used to form a single part.

Figure 3:
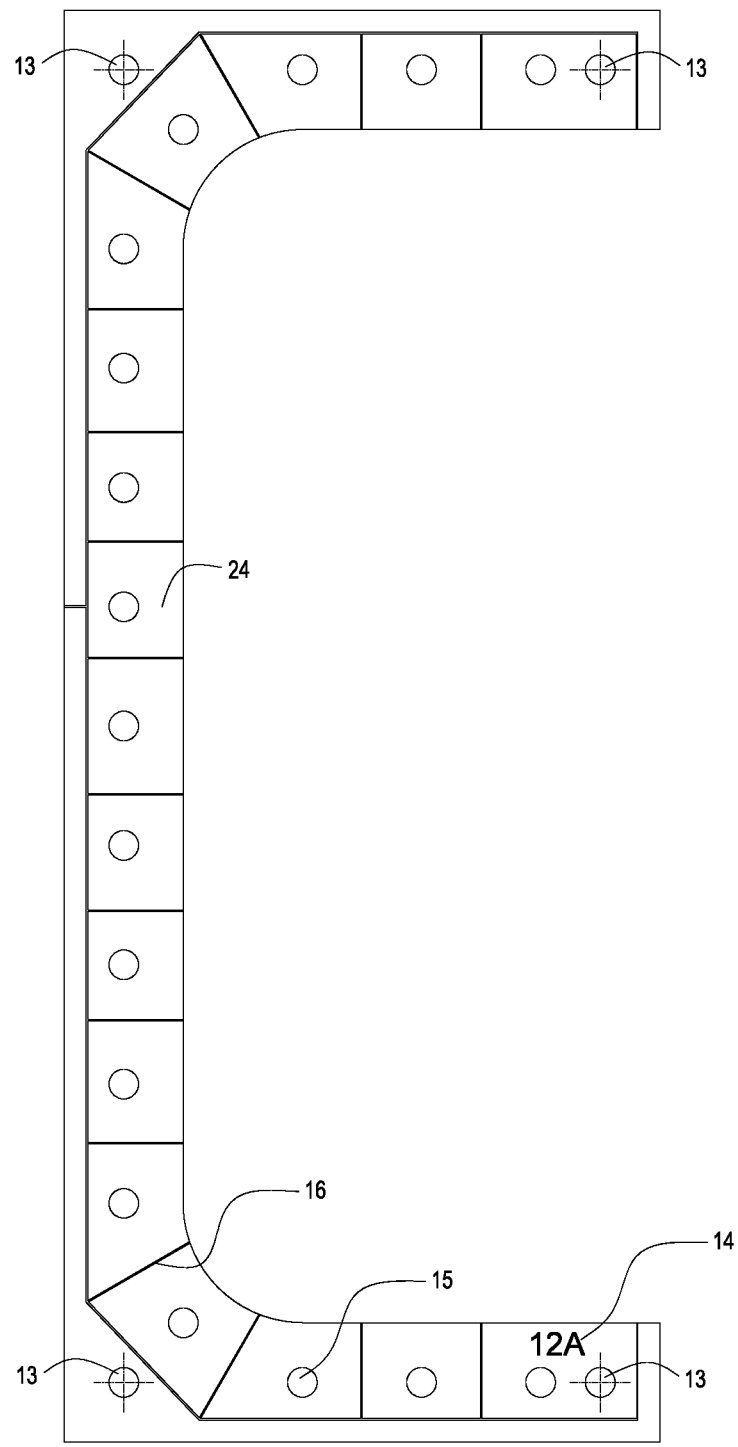
FIG. 3 is a front view of an exemplary mold layer with an identification number and letter, heating and/or cooling passages, vacuum passages, and alignment and/or fastening holes routed into the material.

FIG. 3 shows an individual layer formed by a single section 24 after section 24 was cut with CNC router 11 and removed from the remainder of sheet 12. With reference to FIG. 3, during the process of cutting section 24 from the sheet 12, and before section 24 is separated from sheet 12, alignment and/or fastening holes 13 may be cut in individual sections 24 that will be stacked on one another when the part is assembled. Holes 13 may be sized and positioned so that dowels can be used to align individual sections 24 during assembly, resulting in a finished structure. Holes 13 may be through-holes extending through an entire width of section 24.

In some aspects, sections 24 may be cut from a non-porous material. In particular, sections 24 may be cut from a metallic material. When manufacturing parts 24, CNC router 11 may tend to generate significant force on sections 24, especially relatively narrow parts 24, were holes 13 formed after a segment 24 has been cut from the remainder of sheet 12. It may therefore be desirable to avoid placing these forces on narrow sections 24, by drilling or machining holes 13 located on individual sections 24 during an initial operation. For example, holes 13 may be formed while an entirety of sheet 12 is still in one piece, or before the individual part 24 with holes 13 has been cut from the remainder of sheet 12.

Once holes 13 have been formed, the resulting alignment or fastening holes 13 may be used to screw or otherwise attach what will become individual sections 24, holding them securely to the table of the cutting machine 11 prior to completing the remaining machining operations and cutting them into individual smaller sections 24.

Also, during the process of cutting layer sections 24 from sheet 12, indicia 14 representing information for an individual segment 24 can be printed, etched, or otherwise applied to the surface of each segment 24. For example, indicia 14 may be formed by removing material from segment 24. Information provided by indicia 14 may be useful during assembly. This information may include the layer associated with the individual segment 24, the section's 24 position on that layer, and the like, to facilitate sorting and assembly of sections 24. In some aspects, indicia 14 may be advantageous, for example by avoiding the need to use a label which must be removed during assembly to prevent the label from interfering with the assembly process.

In some aspects, holes and/or slots can be cut by machine 11 in individual layer sections 24 in such a manner that when sections 24 are stacked on each other, these holes or slots creating sealed channels 15 that extend through the interior of the part. These channels 15 may be used for circulating liquid (e.g., coolant, which can be heated or cooled), steam, or other fluids through the final part (e.g., a tool, such as a mold). For example, when the assembled part is a mold, channels 15 for coolant may extend through the body of the mold for controlling the temperature of the mold during use of the mold to make a part.

For parts that form tools, and in particular, thermoforming molds, shallow slots 16 may be formed within one or more sections 24. For example, as shown in FIG. 3, slots 16 may be machined across a wall on sections 24 during the machining process to provide a path for air to be removed during a vacuum-forming process, eliminating the need to drill vacuum vent holes as a secondary process.

For some parts, it may be desirable for individual layers to be tightly adhered to each other. For example, tools such as molds may function best when layers forming the mold are secured in a leak-tight manner. In the example of molds that are not intended to be subject to significant forces during use, such as thermoforming or fiberglass layup molds, individual layers may be bonded to each other using an appropriate adhesive. However, other approaches to accomplish tight adherence are also contemplated.

Figure 4:
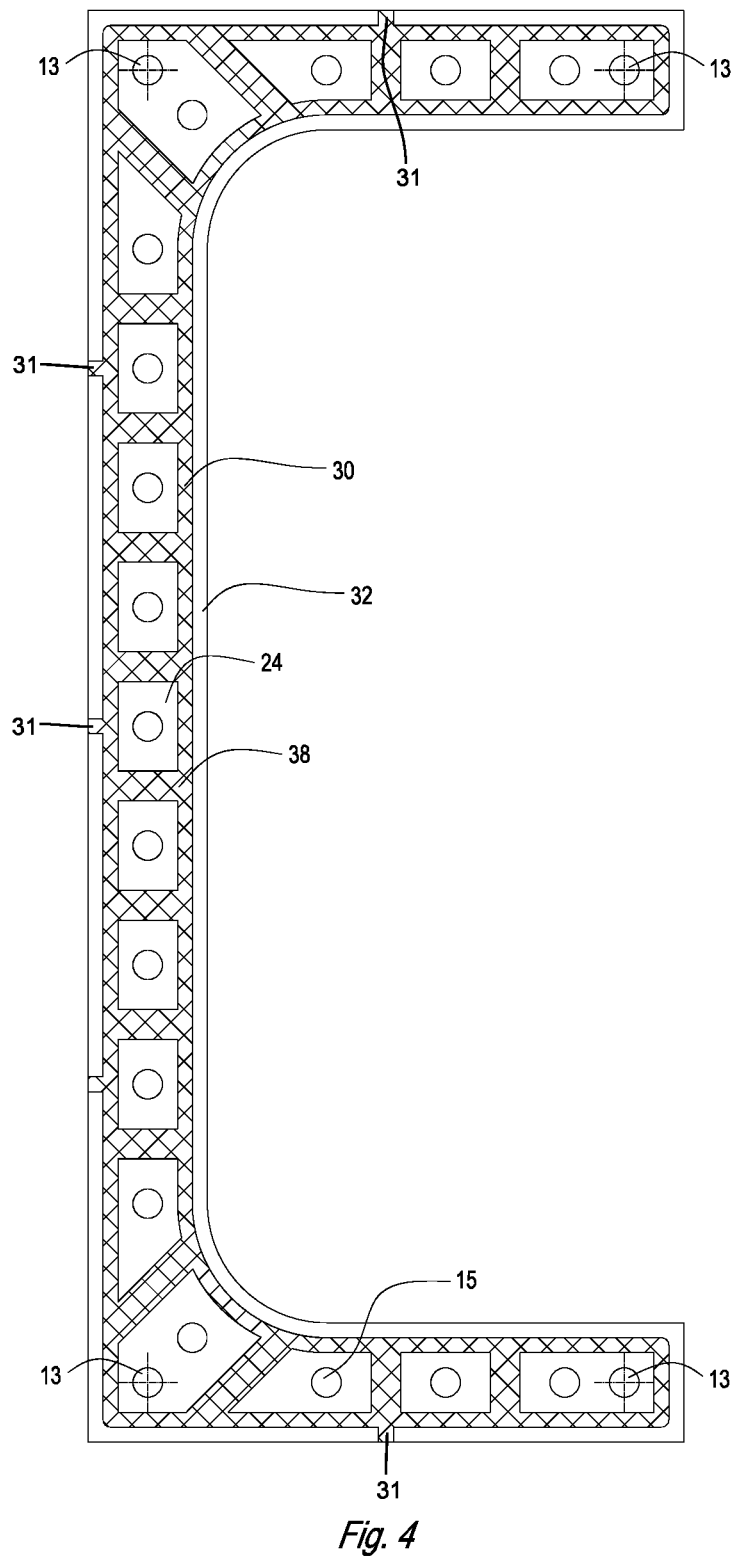
FIG. 4 is a front view of an exemplary mold layer with a channel (e.g., an adhesive channel) routed in a side of the layer.
Figure 5:
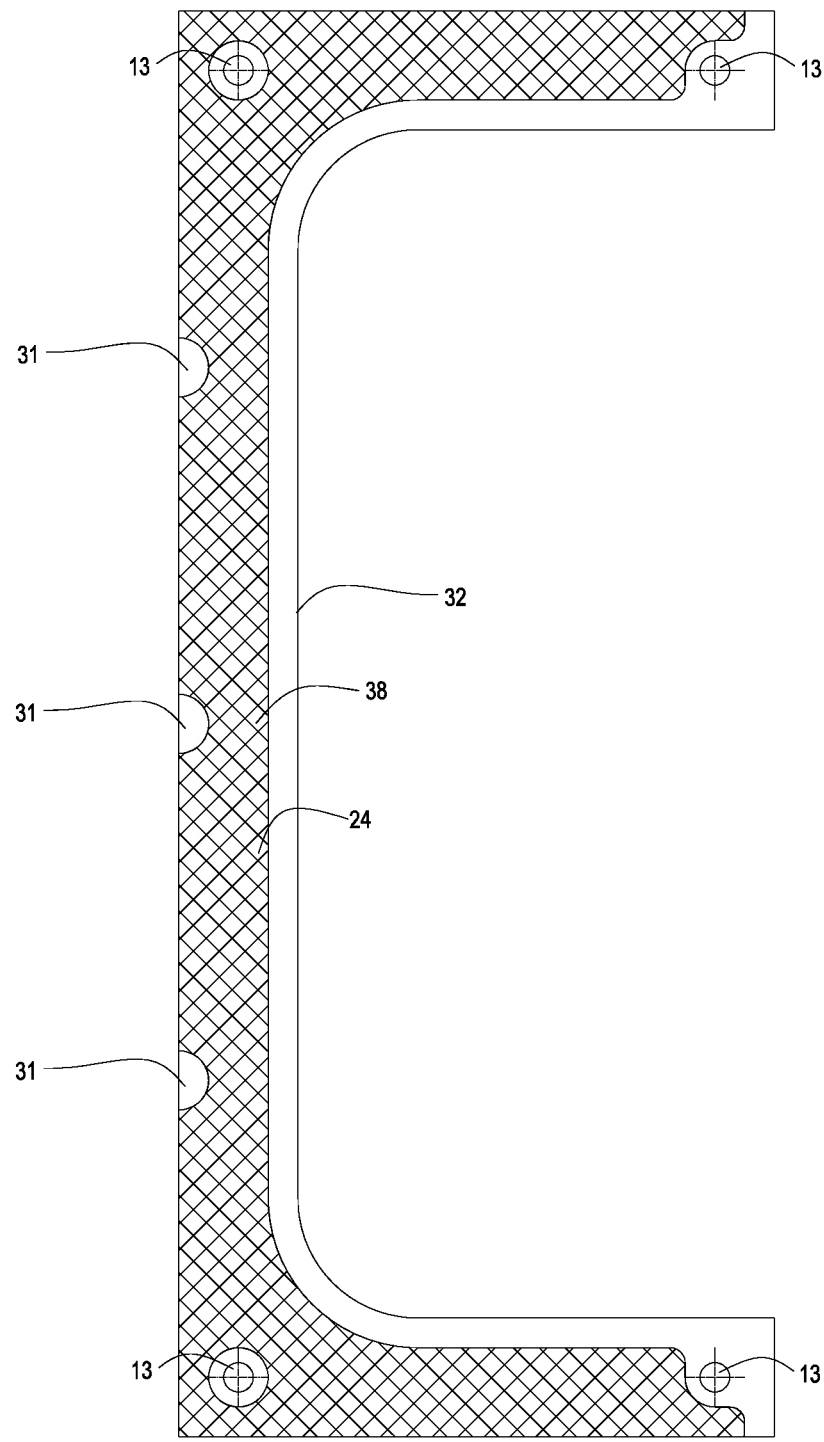
FIG. 5 is a front view of an exemplary mold layer with a majority of the side of the layer routed away to receive adhesive, with bosses remaining in the layer to facilitate spacing of the layers.

FIGS. 4 and 5 illustrate examples of sections 24 useful for adhesive bonding. In adhesively-bonded layers, each layer formed with one or more sections 24, an area of section 24 may be machined, routed away, or otherwise removed. For example, about 0.005 to about 0.030 inches (about 0.13 mm to about 0.76 mm) of material may be removed from a face of section 24. This removed material is represented in FIGS. 4 and 5 by a portion 38 containing X-pattern hatching. Material removed from portion 38 may provide room for the adhesive.

In the example illustrated in FIG. 4, a glue channel 30 is formed by removing material (e.g., via routing) into the side of the section 24, with a face 32 of the layer part 24 left solid (i.e., material is not removed from face 32). Glue channels 30 may include exits 31 formed in the sides (top and bottom portions of FIG. 4) and/or bottom (left portion of FIG. 4) of section 24. Exits 31 may facilitate flow of glue or other adhesive by providing a flow path for this adhesive and preventing adhesive from squeezing out on to the mold face.

FIG. 5 is a front view illustrating another example of section 24, with hatched portion 38 representing material that was removed. As can be seen in FIG. 5, the material removed from section 24 may form a U-shaped recess within face 32, this portion corresponding to a bottom of the mold. This removed material may provide room for the adhesive flow in a part (e.g., mold) that does not employ cooling channels.

In particular, as shown in FIG. 5, an entire side or most of a side of section 24 may be machined away (e.g., by removing about 0.005 to about 0.030 inches (about 0.13 mm to about 0.76 mm) of material), leaving an adequate stock of material on face 32 of section 24 around the alignment or fastening holes 13. In some aspects, bosses 31, formed by portions where material was not removed by machining, may function to maintain proper spacing between two abutting sections 24. Similar to the example illustrated in FIG. 4, the adhesive may be allowed to squeeze out from the sides and bottom of section 24 of the mold. FIGS. 4 and 5 may be used with an adhesive, such as glue, that can be applied at room temperature, or any other suitable adhesive.

Figure 6A:
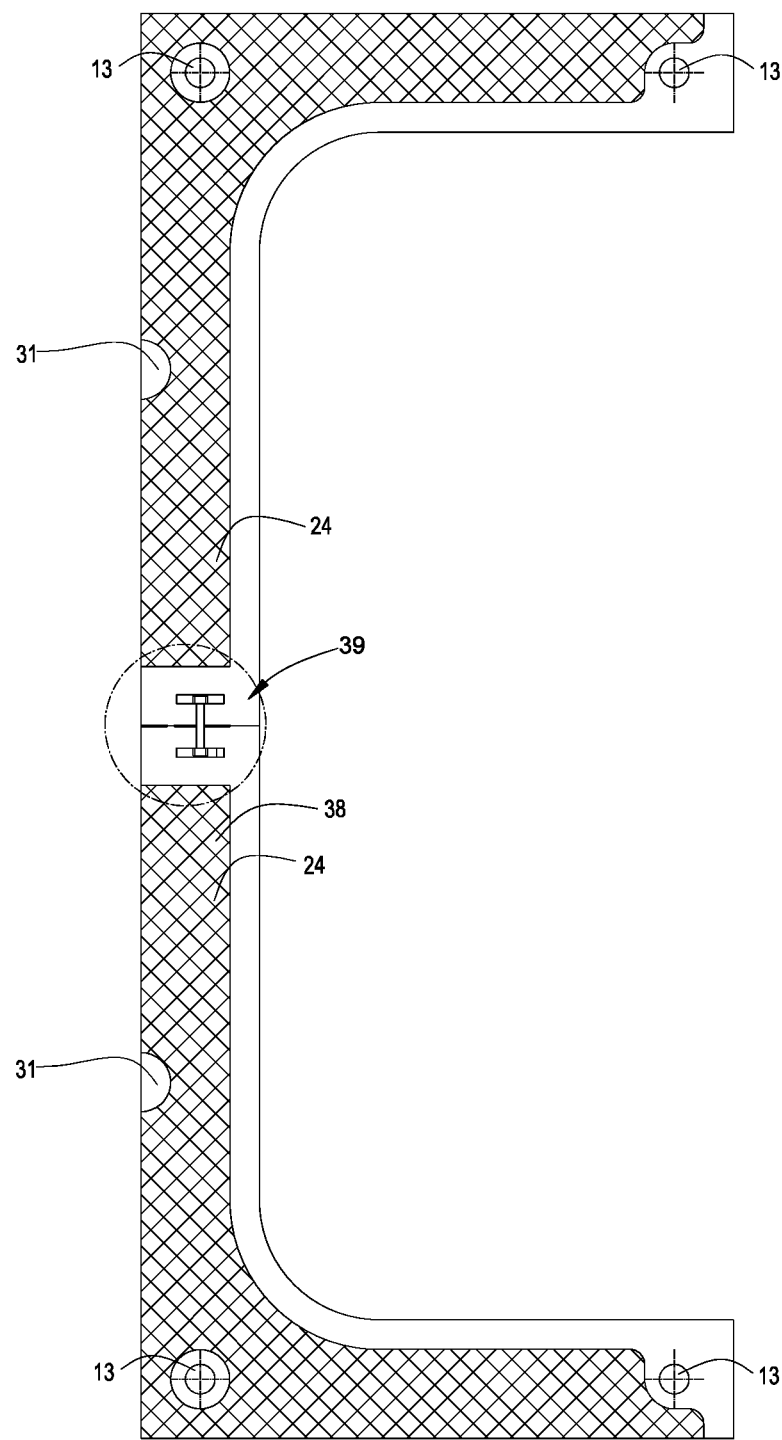
FIG. 6A is a front view of an exemplary mold layer formed in two pieces that form a joint (e.g., by bonding the two pieces together with adhesive and pulling the pieces tight with mechanical means such as a bolt and nut).
Figure 6B:
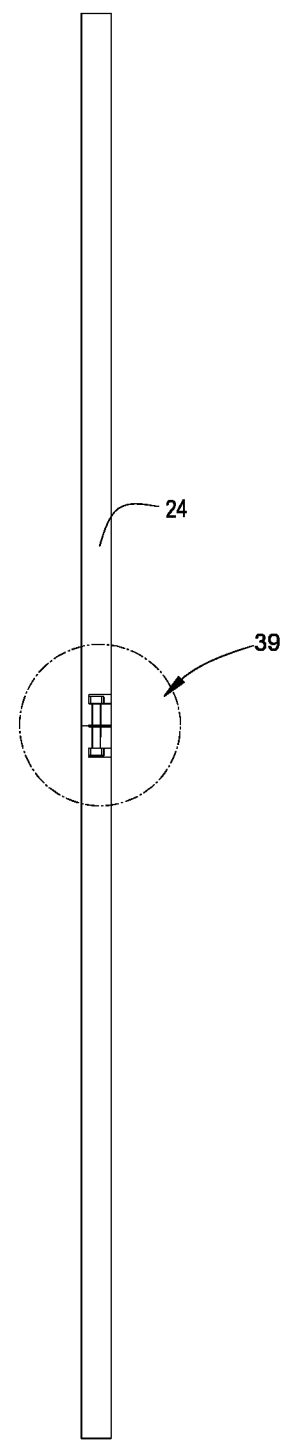
FIG. 6B is a bottom view of the exemplary mold layer of FIG. 6A.

In at least some embodiments, one or more sections 24 of a part may be formed as a single monolithic part, as shown in FIGS. 4 and 5, for example. Thus, each section 24 can form a respective layer of the part. However, a part may include one or more sections 24 of a layer that are formed as two or more pieces, as shown in FIGS. 6A and 6B. These multi-piece sections 24 may have ends that are joined together with adhesive at a joint 39 and/or pulled tight at joint 39 by mechanical means.

FIG. 6A shows a front view of the two pieces of the section 24 joined together with a circle around the area of joint 39. FIG. 6B shows a bottom view of section 24 formed as two pieces connected at joint 39.

Figure 7:
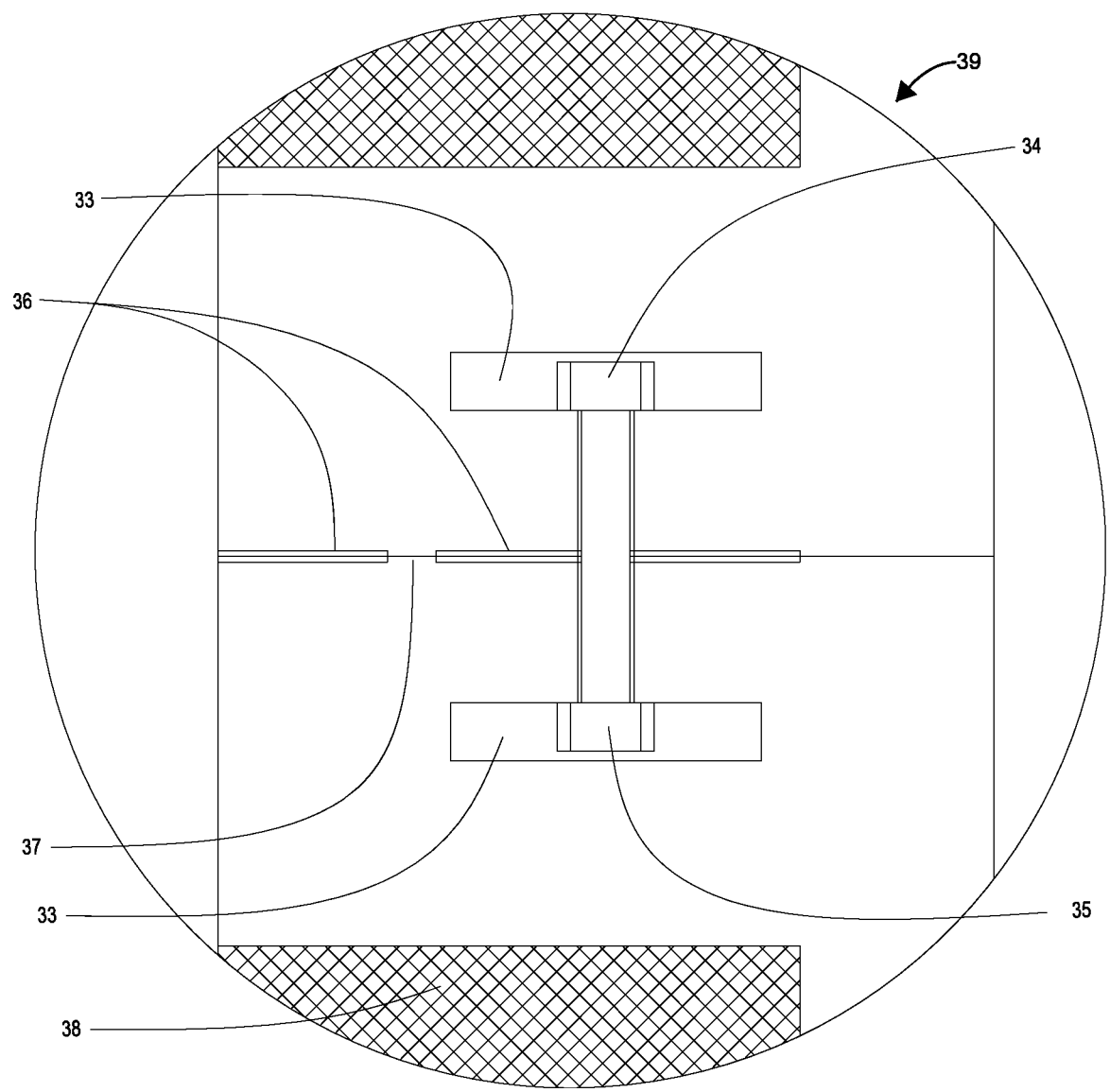
FIG. 7 is an enlarged front view of the joint in FIGS. 6A and 6B.
Figure 8:
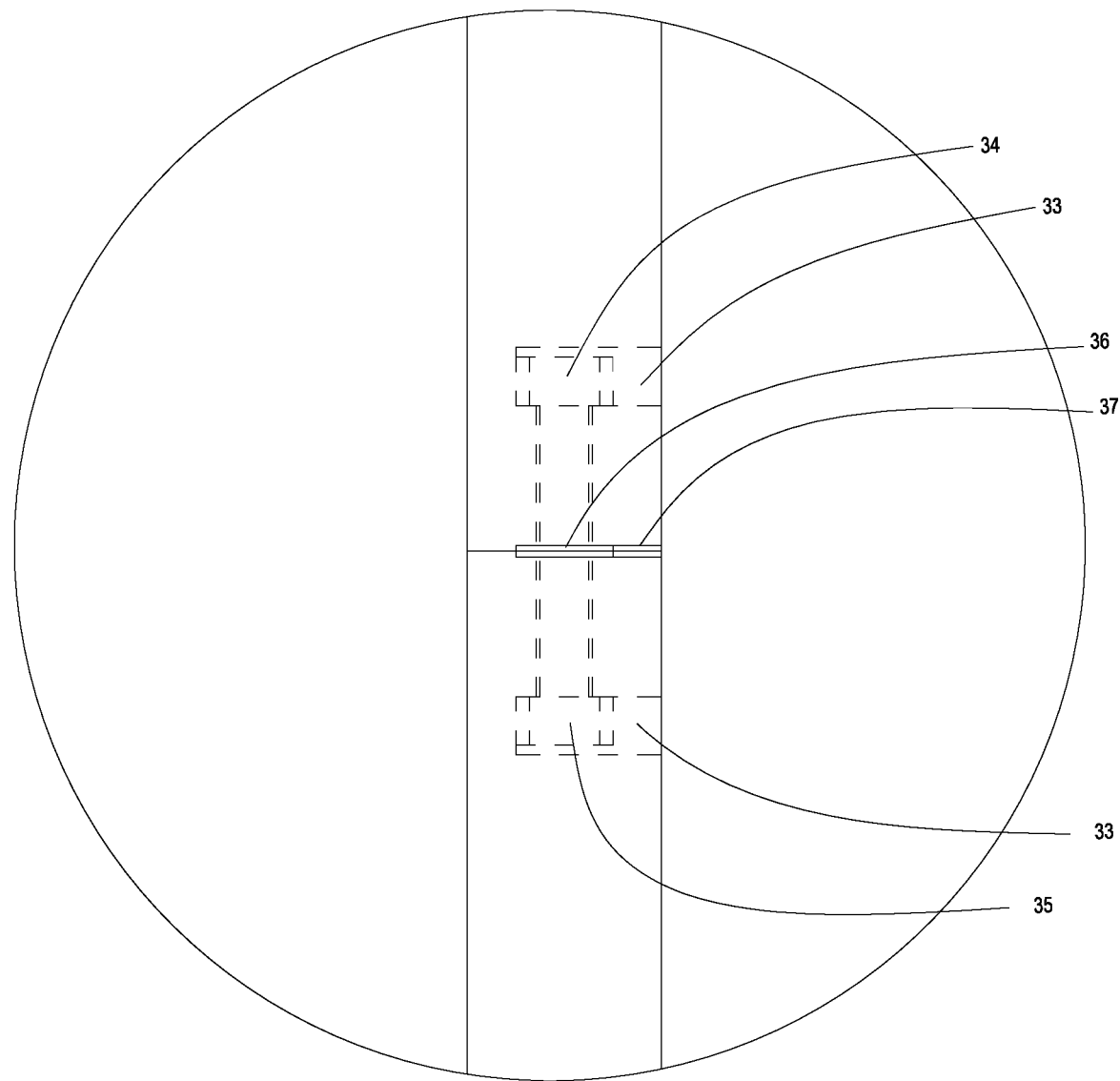
FIG. 8 is an enlarged bottom view of the joint in FIGS. 6A and 6B.

FIG. 7 is an enlarged front view showing joint 39. As shown in FIG. 7, joint 39 may include a slot 33 with a suitable shape, a T-shape being shown. Slot 33 may be machined into section 24 to facilitate the placement of a bolt 34 and a nut 35. Bolt 34 and nut 35 may be used to tightly pull the abutting ends that form joint 39, which may include adhesive, together. When adhesive is used, adhesive may be applied in a slot 36. The adhesive-receiving slot 36 may be machined three quarters (i.e., 75%) of the thickness of section 24, as shown in FIGS. 7 and 8. A boss 37, as shown in FIGS. 7 and 8, similar to bosses 31 (FIGS. 5 and 6A) may be configured maintain a desired spacing between the two or more pieces that together form a single section 24.

Figure 9:
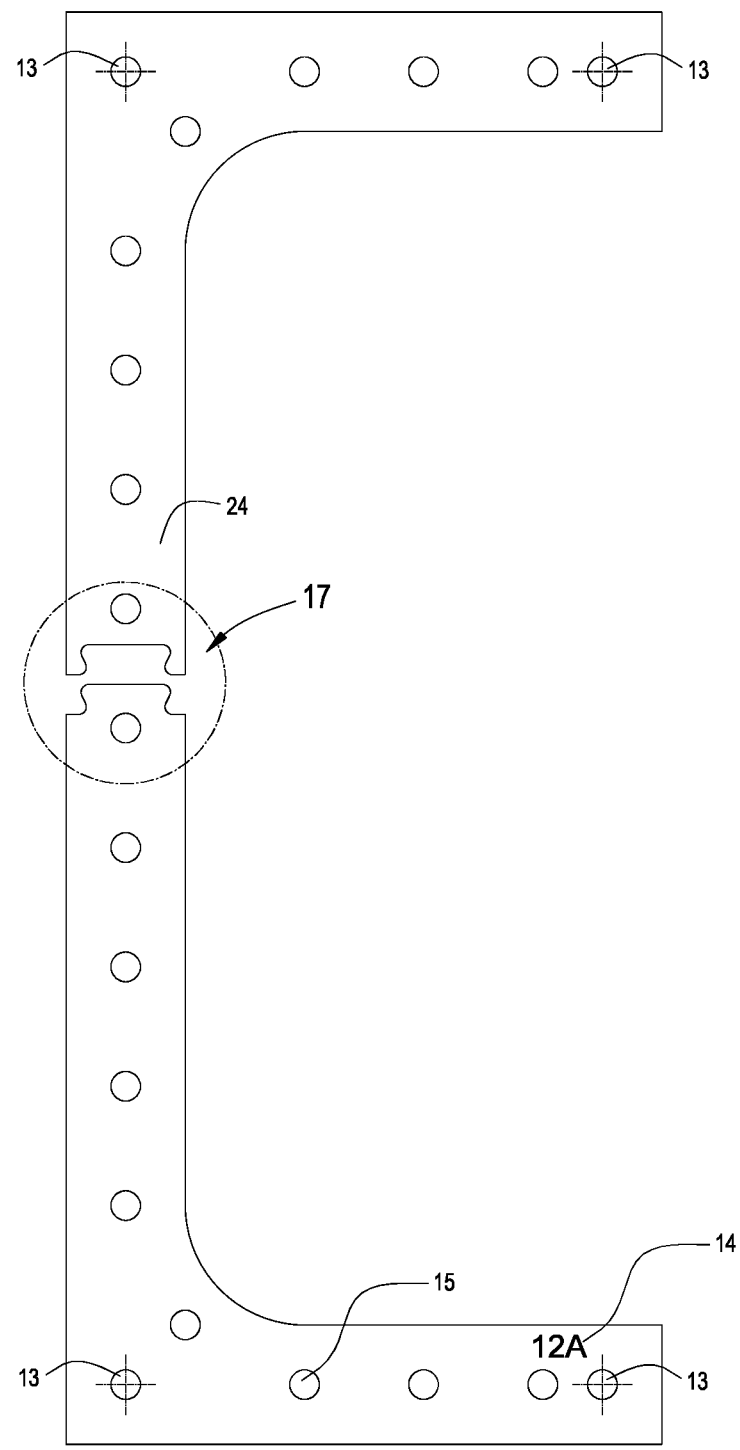
FIG. 9 is a front view of an exemplary mold layer with another example of a joint connecting two pieces together.
Figure 10:
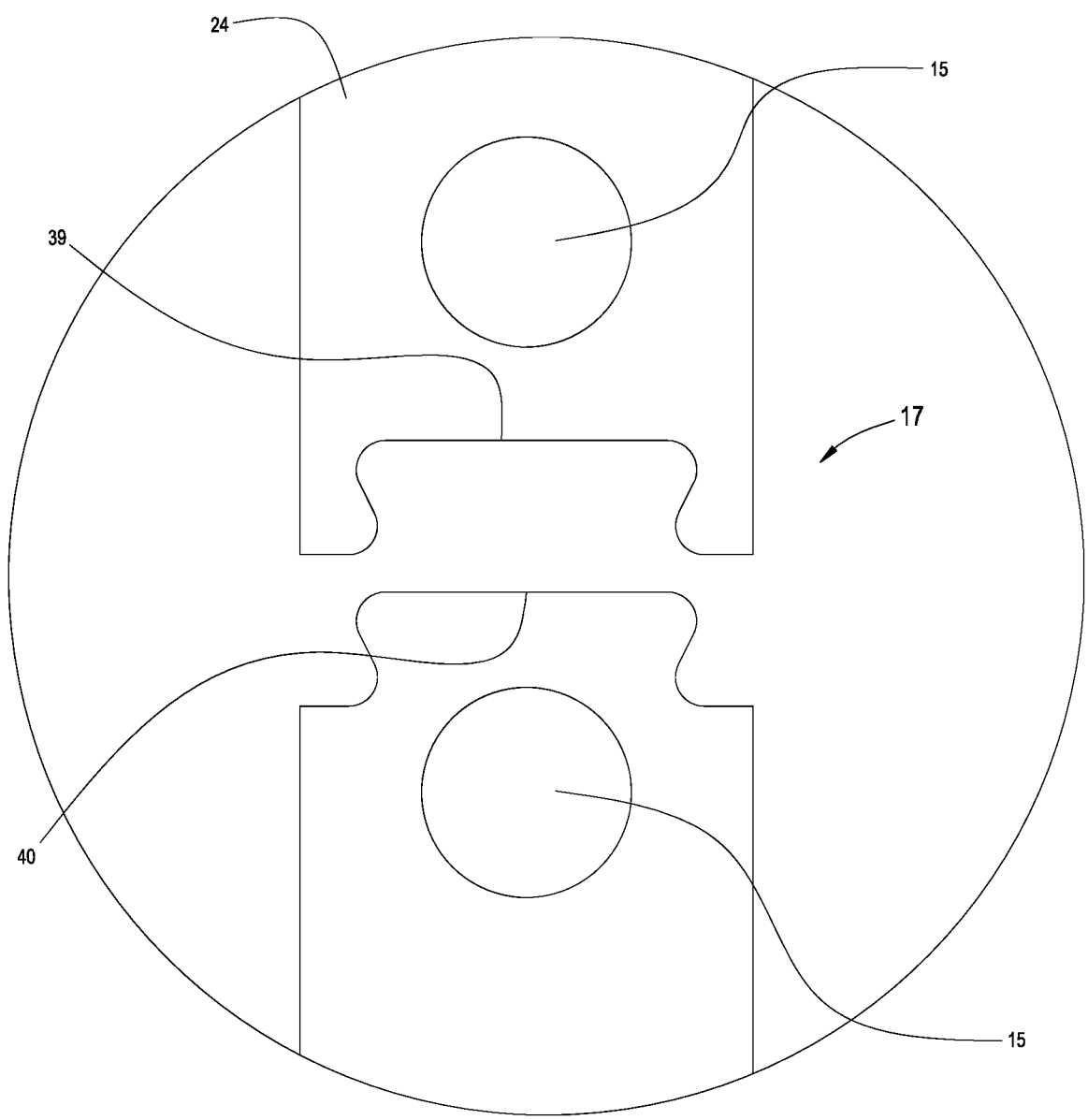
FIG. 10 is an enlarged front view of the joint in FIG. 9.

While some embodiments involve the use of adhesive to join multi-piece sections 24, adhesive is not required in all embodiments. For example, as shown in FIG. 9, a joint 17 may connect separate pieces of a particular section 24 together without the use of adhesive. While one exemplary, relatively simple, design is shown in FIGS. 9 and 10, other designs could be used and are contemplated by the present disclosure.

In some aspects, joint 17 may be similar in at least some respects to a joint used to connect puzzle pieces together. For example, with reference to FIG. 10, one side may have a female shape 39 while the other opposing edge has a male shape 40. The two or more separate pieces of part 24 having joint 17 may be joined together by pressing one piece of section 24 on top of the other. The male shape may interlock inside the female shape so that the two parts cannot be pulled directly apart.

Mechanical means for attaching a plurality of layers together may include fasteners (e.g., screws or rivets), welding, or other mechanisms. When fasteners are used, each section 24 or group of sections 24 may be fastened to another section 24 or group of sections 24 by bolts. Each bolt may connect two sections 24 together, or may connect three, four, five, or more sections 24 together, as described below.

Figure 11:
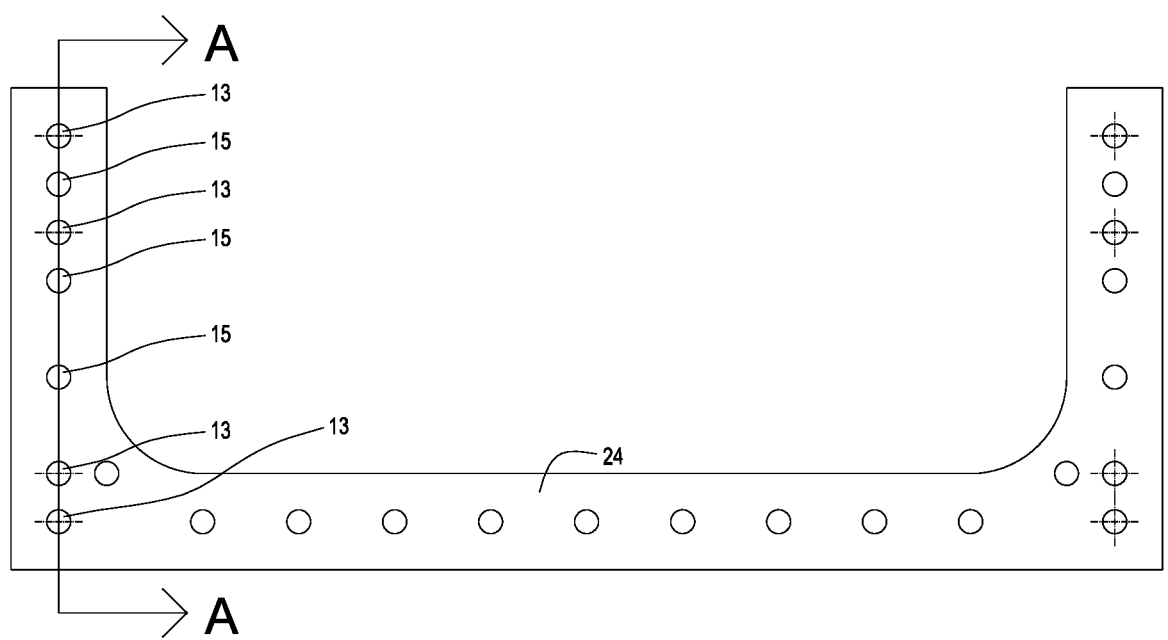
FIG. 11 is a front view of an exemplary section of a mold an exemplary fastening technique.
Figure 12:
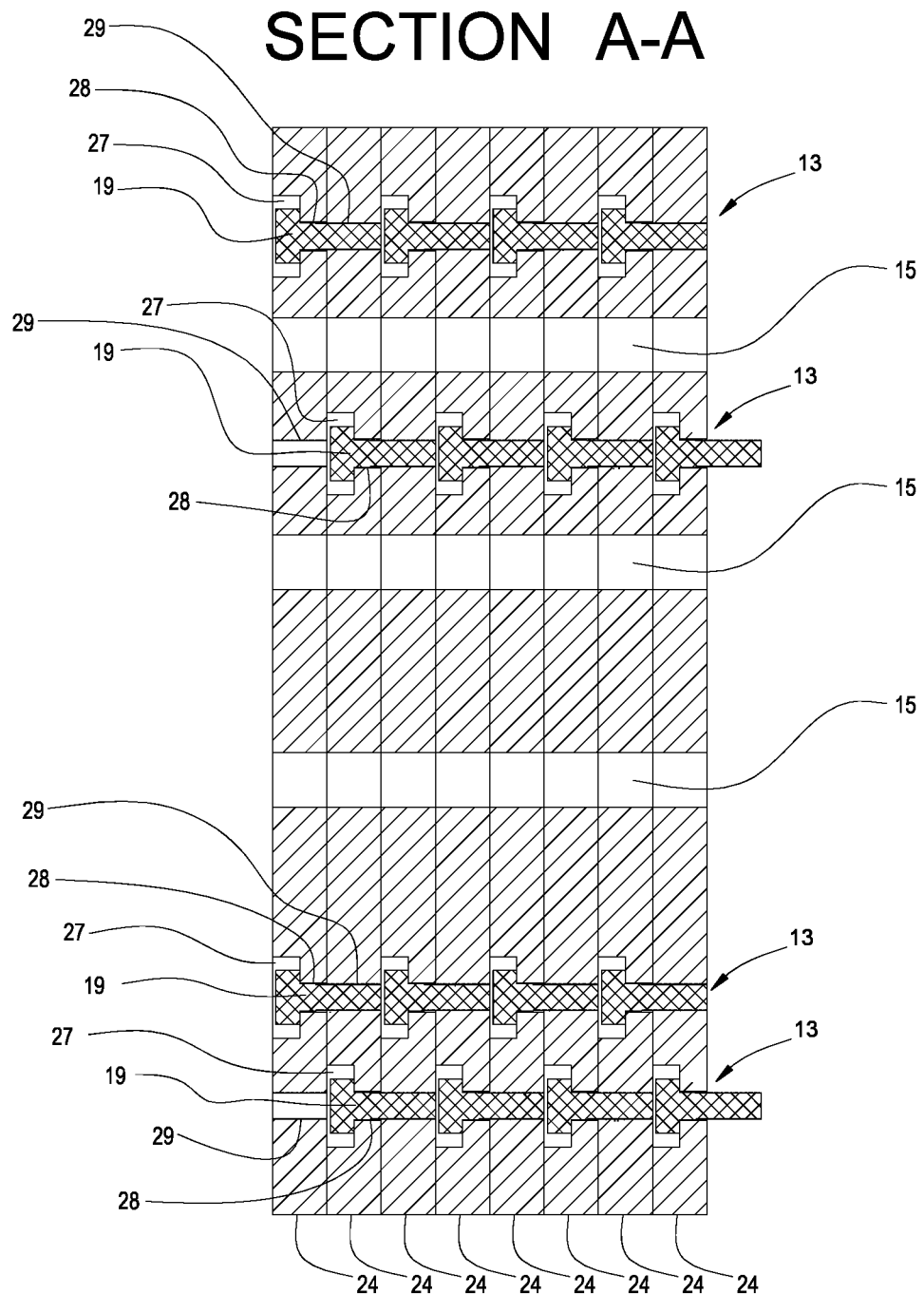
FIG. 12 is a cross-sectional view of section A-A of FIG. 11, illustrating fastening used to secure a series of layers.

FIG. 11 shows an example of a section 24 that may be secured to additional sections 24 via fasteners. FIG. 12 is a cross-sectional view of FIG. 11 along line A-A, showing fasteners inserted in alignment and/or fastening holes 13 of a plurality of stacked sections 24.

FIGS. 11 and 12 also show exemplary locations of coolant channels 15 and alignment and/or fastening holes 13 when a plurality of sections 24 abut each other along a first direction (e.g., a horizontal direction), while part 20 has an opening facing a second direction (e.g., a vertical direction). FIG. 12 shows bolts 19 inserted into holes 13. While at least some coolant channels 15 and holes 13 may form through-holes that are aligned with each other, and distributed in a manner that forms a generally U-shaped pattern, other patterns, including irregular patterns, may be employed.

With reference to FIG. 12, each section 24 may have a counterbore hole 27 with a through-hole 28 (an example of hole 13) which lines up with a threaded hole 29 (another example of hole 13) in the next section 24. As can be seen in FIG. 12 a first series of holes 13 alternate between counterbore hole 27 and through-hole 28 pairs and threaded holes 29. A second series of holes 13 has an opposite pattern of repeating pairs of holes 27 and 28 and threaded holes 29.

Figure 13:
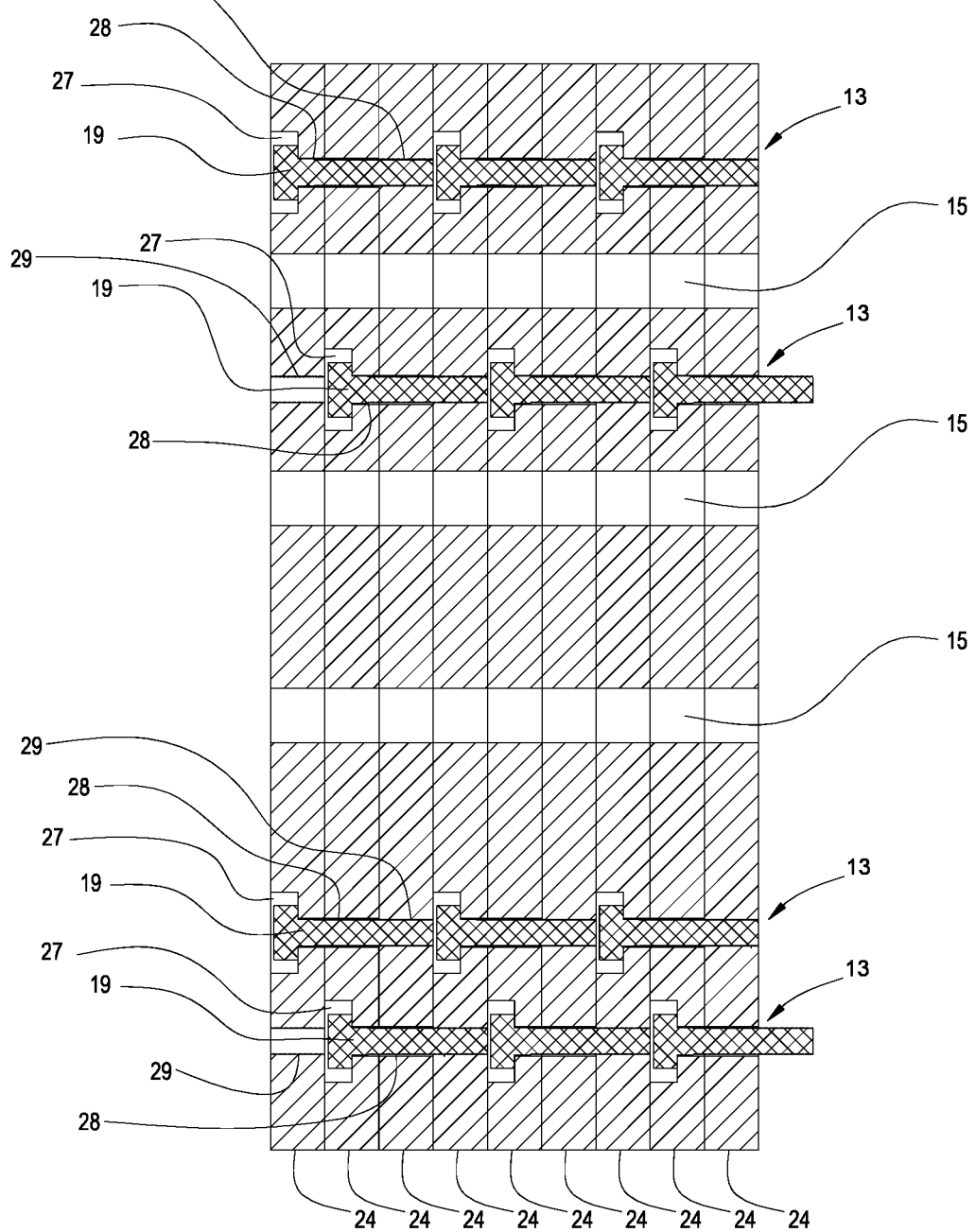
FIG. 13 is a cross-sectional view of section A-A of FIG. 11, illustrating another example of fastening used to secure a series of layer.

FIG. 13 shows an exemplary configuration of a part in which a first section includes a counterbore hole 27 and a through-hole 28 and the next two sections 24 include threaded holes 29. Thus, groups of sections 24 may be bolted together with bolts 19 having a different (e.g., longer) length as compared to bolts 19 in the configuration shown in FIG. 12.

FIGS. 14-17 show an exemplary part 20 assembled from sections 24 that may be formed and configured as described above. Part 20, as shown in these Figures is a compression or injection mold having four walls, a bottom, and an open side. An opening formed on the open side may face a direction perpendicular to a direction in which sections 24 are stacked (e.g., a vertical direction). However, as understood, other types of parts are contemplated herein and this disclosure is not limited to parts 20 that operate as molds.

Figure 14:
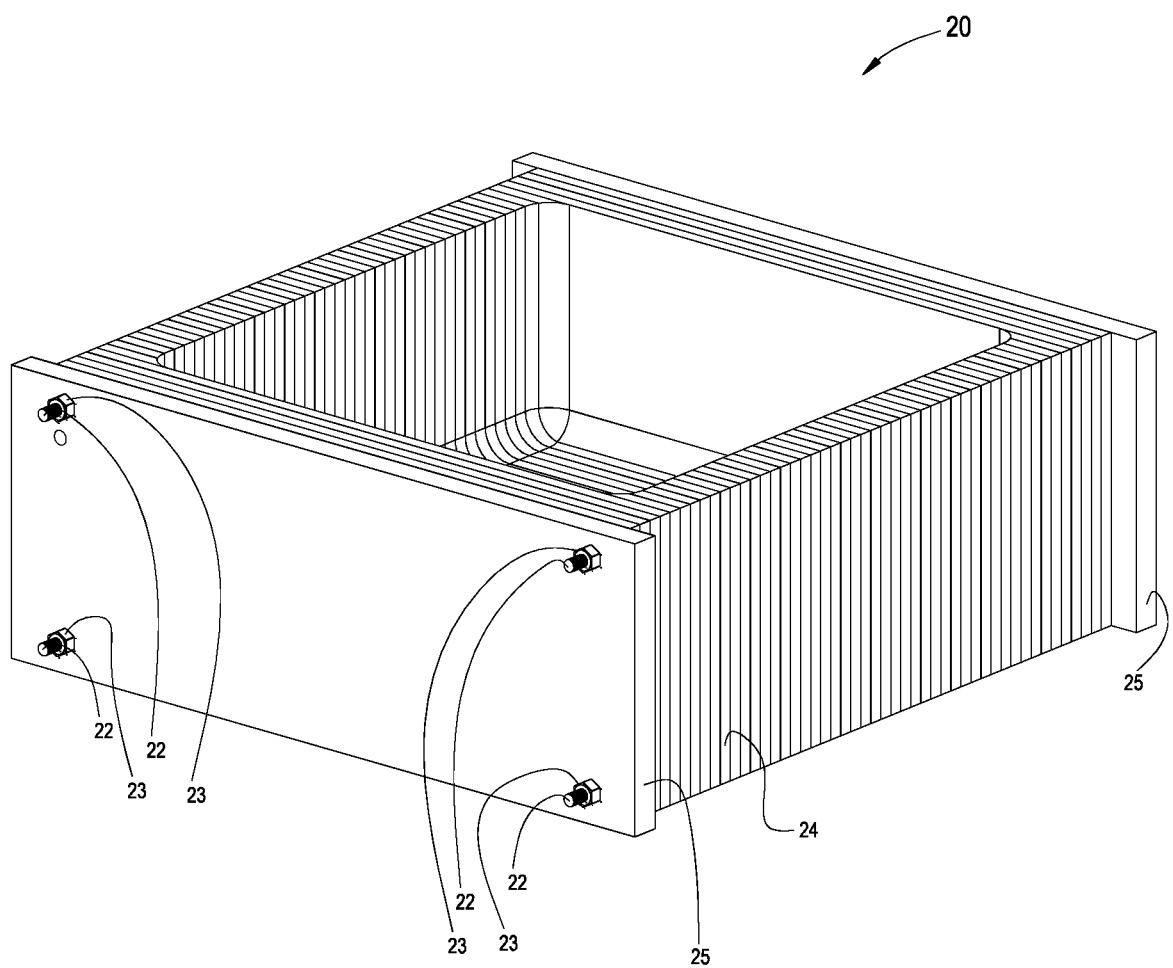
FIG. 14 is a perspective view of an exemplary mold that can be produced with steel backer plates and rods.
Figure 15:
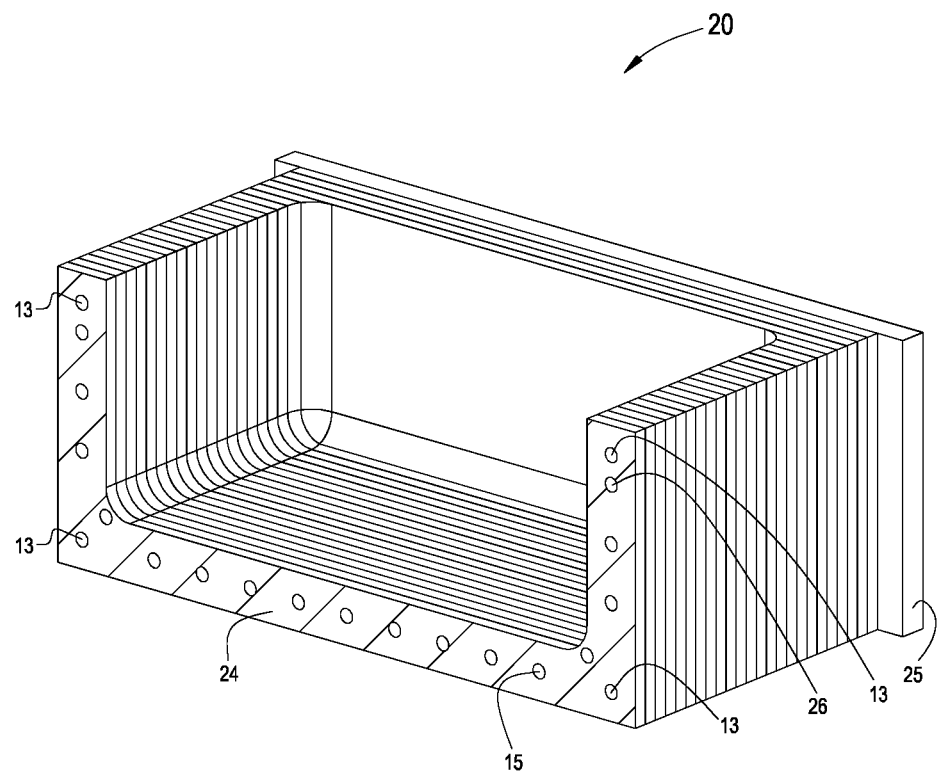
FIG. 15 is a perspective view of the mold shown in FIG. 14 with some layers removed, showing a layer that was cut with the CNC machine of FIG. 1, for example.
Figure 16:
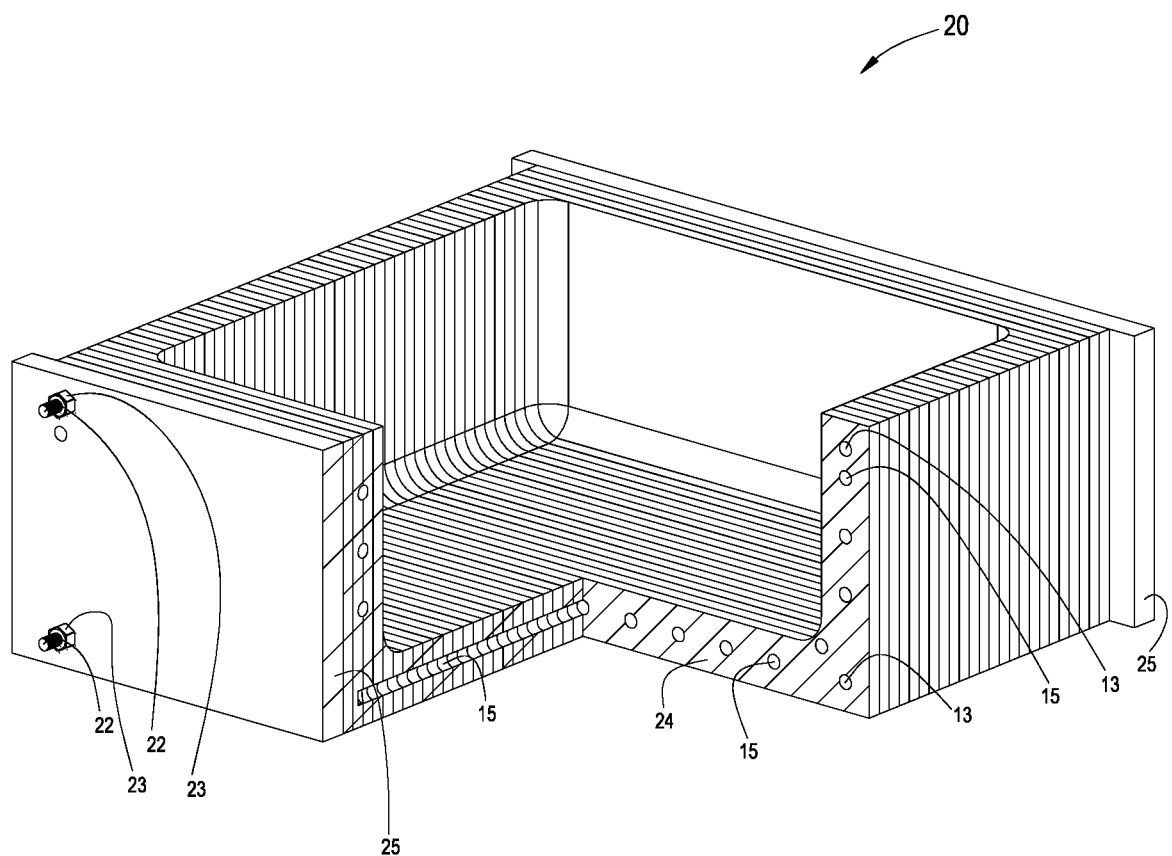
FIG. 16 is a partial cross-sectional view of the mold shown in FIG. 14.
Figure 17:
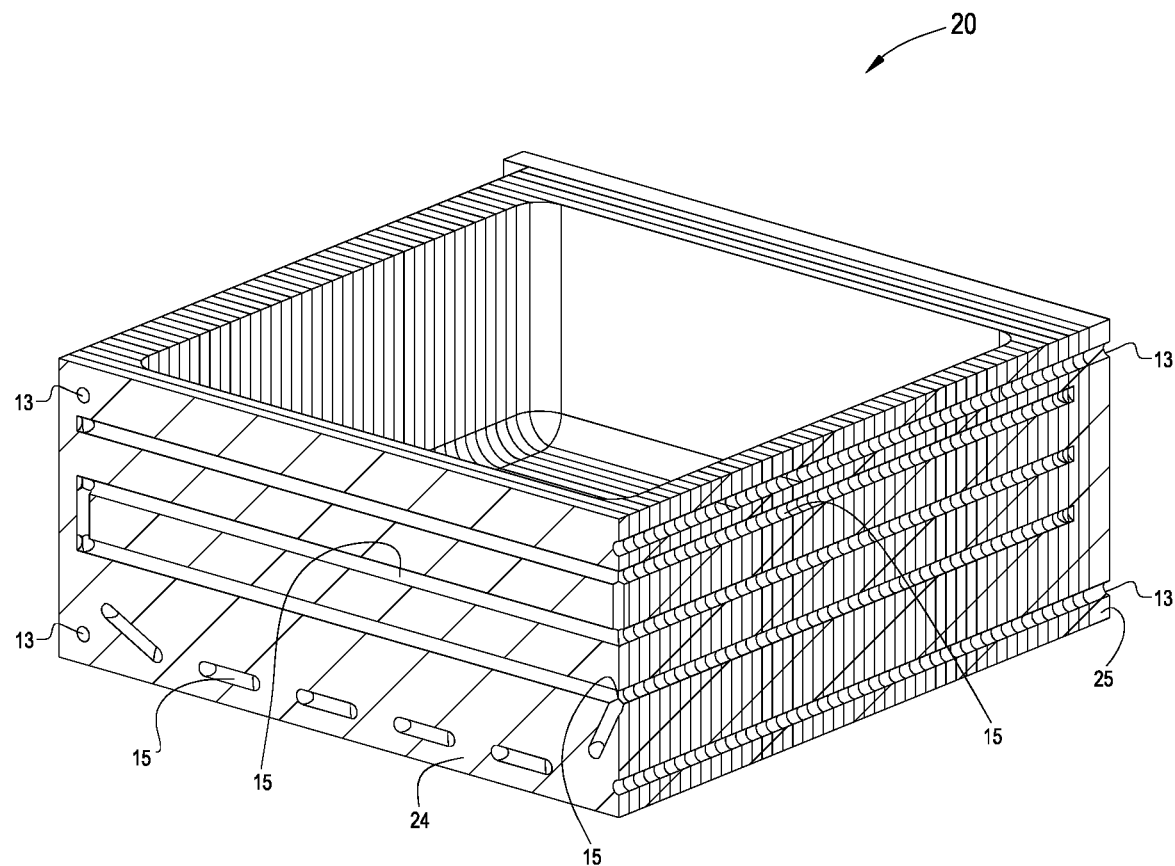
FIG. 17 is a perspective cross-sectional view of the mold shown in FIG. 14, showing connections between heating and/or cooling passages.

Metal molds, such as compression or injection molds, may be subject to relatively high levels of force during operation. An exemplary mold 20 is shown in FIGS. 14-17. While mold 20 may be formed according to the description above, another approach may be used if desired. For example, alignment and/or fastening holes 13 may extend through an entirety of mold 20 (e.g., an entire length of mold 20 as measured in a stacking direction along which individual sections 24 abut each other). These alignment and/or fastening holes 13 may be drilled as part of the initial process of cutting the parts 24 from sheets, for example as shown and described above with respect to FIGS. 1 and 2. For aluminum molds, steel rods 22, as shown in FIG. 14, may be threaded on each end. These steel rods 22 (which may be formed of another material, if desired) may pass through alignment and/or fastening holes 13, such that, when nuts 23 or other restraining devices are applied to both ends and tightened, nuts 23 force the aluminum layers formed by sections 24 tightly together (e.g., sufficiently tight to form an air-tight seal).

The systems and methods described herein may be associated with further advantages. Metals, including aluminum and steel, expand when heated. Materials, including aluminum, may expand at a rate that is faster than that of other metals, such as steel. In the arrangement described above, as an assembled tool (e.g., mold 20) heats up, an aluminum mold body formed by sections 24 may expand at a faster rate than rods 22, formed of steel, rods 22 holding the layers formed by sections 24 together. This may results in a significant force being developed, the force tending to push the layers together. However, since significantly more force may be needed when compressing the aluminum mold body than to stretch steel rods 22, steel rods 22 may be stretched by the force created due to thermal expansion of aluminum sections 24, such stretching creating a significant mechanical force pushing the layers tightly together. Thus, the use of steel rods 22 and geometry of rods 22 (e.g., as described above) may result in a mold 20 having sufficient strength to withstand forces generated by the molding process. In at least some embodiments, steel rods 22 can be attached directly to an aluminum body of mold 20 formed by sections 24. In other embodiments, steel plates 25 may be positioned at one or both outer ends of the body of mold 20, the steel plates 25 assisting in to further distributing forces generated during the molding process, including thermal expansion of the mold itself.

Figure 18:
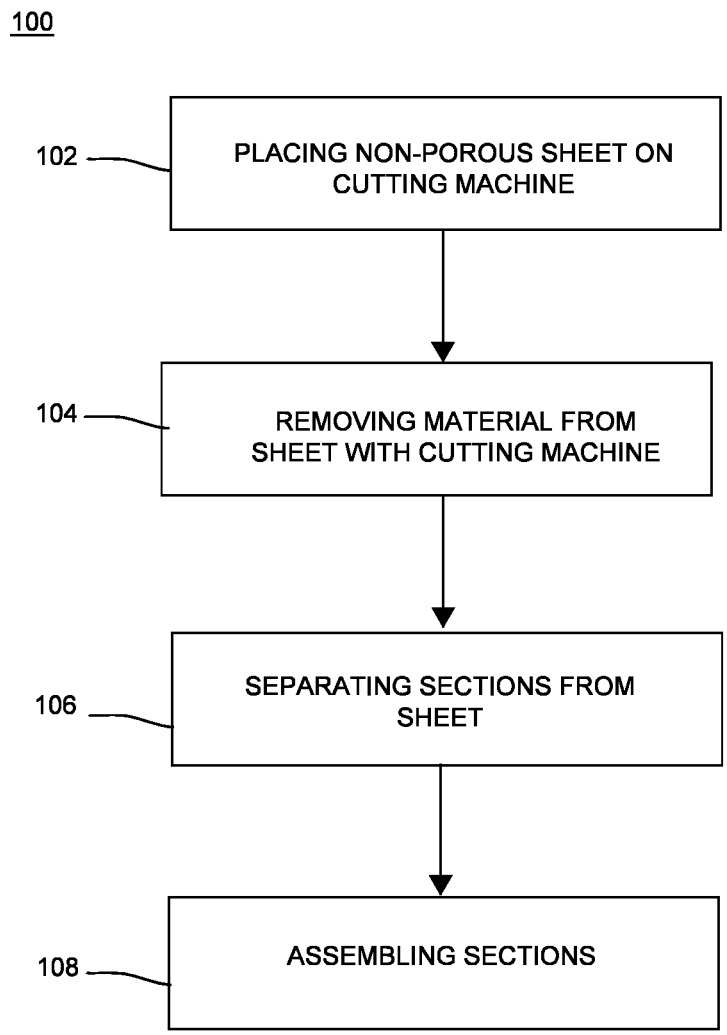
FIG. 18 is a flowchart illustrating an exemplary method according to aspects of the present disclosure.

FIG. 18 is a flowchart showing an exemplary method 100. Method 100 may include a step 102 of placing a non-porous sheet of material 12 on a cutting machine, such as machine 11, as described above. A step 104 may include removing material from sheet 12 using machine 11 to form individual sections 24, these sections 24 corresponding to one or more of the sections 24 described above. If desired, holes 13 and/or 15 may be formed before sections 24 are removed from sheet 12.

In a step 106, one or more sections 24 may be removed from the remainder of sheet 12. Finally, sections 24 may be assembled to form a part 24. These sections may be secured with rods, fasteners, adhesive, etc.

The disclosed systems and methods may provide several advantages. As a first example, sheets of material, such as aluminum for example, may be less expensive per pound than large blocks of the same material. Also, since the assembled mold 20 does not include significant amounts of material that would need to be machined away, in contrast to use of solid blocks of material, fewer pounds of material are needed. While metal materials may be used to form a part 20, part 20 may be made from other materials, including polymer sheets, even when the material is not generally available in large blocks. Since a smaller amount of material needs to be removed to achieve the final desired mold surface using the stacked design, machining time is significantly less than cutting from a solid block, cutting tool wear is less, and wear and tear on the machining center is also less. Further, use of a cut layer approach may generally be faster, allowing parts such as tools to be constructed in less time. The approach of machining heating and/or cooling channels 15 (FIG. 17) in parts cut from sheets of material may facilitate positioning of heating and/or cooling channels 15 in areas and along paths that cannot be machined into solid blocks.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. A method of manufacturing a part using a cutting machine, the method comprising:
   placing a non-porous sheet on a surface of a material cutting machine;
   removing material from the non-porous sheet to form a plurality of sections of the part;
   while the non-porous sheet is present on the material cutting machine, forming fastening holes within the sections;
   removing the sections, as separate pieces, from a remainder of the non-porous sheet, at least one of the sections being formed as a plurality of pieces that together form a layer of the part;
   placing the sections together such that each section of the part abuts another section, two or more of the pieces being connected to each other by a joint having interlocking shapes; and
   inserting fasteners through the fastening holes of the sections.

2. The method of claim 1, further including forming one or more channels for coolant by removing material from the non-porous sheet while the non-porous sheet is present on the material cutting machine.

3. The method of claim 1, further including forming one or more paths for adhesive by removing material from the non-porous sheet while the non-porous sheet is present on the material cutting machine.

4. The method of claim 3, wherein the one or more paths for adhesive includes an exit formed in a side of one or more of the sections.

5. The method of claim 1, wherein the part is a mold and at least some of the sections form a bottom wall and a pair of side walls of the mold.

6. The method of claim 5, wherein the sections forming the mold are placed together such that each section of the part abuts another section along a first direction and the mold has an opening facing a second direction.

7. The method of claim 1, wherein the non-porous sheet is a metal material.

8. A method of manufacturing a part using a cutting machine, the method comprising:
   placing a sheet of material on a surface of a material cutting machine;
   removing material from the sheet to form a plurality of sections of a part including first and second sections on the sheet that have a first portion of a joint and a second portion of the joint, respectively;
   removing additional material from the sheet to form a slot for vacuum-forming, a path for coolant, or both;
   separating the sections from a remainder of the sheet, at least one of the sections being formed as a plurality of pieces that together form a layer of the part; and
   assembling the sections together to form the part, two or more of the pieces being connected to each other by the joint, the first portion of the joint and the second portion of the joint having interlocking shapes, including securing the sections with adhesive, fasteners, or both, such that an internal channel is formed through at least two of the sections, at least the first section and the second section being assembled to each other by joining the first portion of the joint and the second portion of the joint.

9. The method of claim 8, further including removing material from an additional non-porous sheet to form additional sections of the part.

10. The method of claim 8, wherein at least one layer of the part is formed by a single section.

11. The method of claim 8, wherein the sheet is a metal material or a polymer material.

12. The method of claim 8, wherein the first and second sections, when connected to each other by the joint, form a single layer of the part.

13. The method of claim 8, wherein one or more sections are formed by two or more additional pieces, the two or more additional pieces being connected to each other by adhesive, resulting in a single layer of the part.

* * * * *